US012633278B2

(12) United States Patent
Mu et al.

(10) Patent No.: US 12,633,278 B2
(45) Date of Patent: May 19, 2026

(54) ACTIVE NOISE REDUCTION METHOD AND DEVICE FOR VEHICLE AND STORAGE MEDIUM

(71) Applicant: SUZHOU RAREVOX ELECTRONICS CO., LTD., Suzhou (CN)

(72) Inventors: Yongsheng Mu, Suzhou (CN); Dengyong Ma, Suzhou (CN); Chao Ye, Suzhou (CN); Yefeng Cai, Suzhou (CN)

(73) Assignee: Suzhou Rarevox Electronics Co., Ltd., Suzhou (CN)

( * ) Notice: Subject to any disclaimer, the term of this patent is extended or adjusted under 35 U.S.C. 154(b) by 164 days.

(21) Appl. No.: 18/725,632

(22) PCT Filed: Nov. 18, 2022

(86) PCT No.: PCT/CN2022/132878
§ 371 (c)(1),
(2) Date: Jun. 28, 2024

(87) PCT Pub. No.: WO2023/124629
PCT Pub. Date: Jul. 6, 2023

(65) Prior Publication Data

US 2025/0087196 A1 Mar. 13, 2025

(30) Foreign Application Priority Data

Dec. 31, 2021 (CN) ......................... 202111683122.1

(51) Int. Cl.
*G10K 11/178* (2006.01)

(52) U.S. Cl.
CPC .. *G10K 11/17817* (2018.01); *G10K 11/17823* (2018.01); *G10K 11/17825* (2018.01);
(Continued)

(58) Field of Classification Search
CPC ....... G10K 11/17823; G10K 11/17817; G10K 11/17854; G10K 11/17879;
(Continued)

(56) References Cited

U.S. PATENT DOCUMENTS

2015/0086031 A1 3/2015 Goto
2017/0178617 A1 * 6/2017 Christoph ........ G10K 11/17853

FOREIGN PATENT DOCUMENTS

CN 108428445 A 3/2018
CN 109448686 A 3/2019
(Continued)

OTHER PUBLICATIONS

International Search Report and Written Opinion received in International Application No. PCT/CN2022/132878, dated Feb. 23, 2023, in 11 pages.

*Primary Examiner* — Paul Kim
(74) *Attorney, Agent, or Firm* — Knobbe, Martens, Olson & Bear, LLP

(57) ABSTRACT

Disclosed are an active noise reduction method and device for a vehicle, and a storage medium. The active noise reduction method includes the following steps: generating two reference signals according to a target noise to be denoised; generating a control signal and sending it to a sound reproduction device; filtering the reference signals to obtain filtered reference signals; calculating a noise signal; updating an auxiliary control parameter; calculating an updated auxiliary control parameter-based error signal; and updating the control parameter. The method actively reduces the noise of vehicle engines, reduces interior noise pollution, and has a fast convergence speed.

12 Claims, 3 Drawing Sheets

(52) U.S. Cl.
CPC .................. *G10K 11/17879* (2018.01); *G10K 2210/1282* (2013.01); *G10K 2210/3011* (2013.01); *G10K 2210/3026* (2013.01); *G10K 2210/3027* (2013.01); *G10K 2210/3028* (2013.01); *G10K 2210/3055* (2013.01)

(58) Field of Classification Search
CPC ....... G10K 11/17825; G10K 11/17875; G10K 11/17883; G10K 2210/1282; G10K 2210/3011; G10K 2210/3026; G10K 2210/3027; G10K 2210/3028; G10K 2210/3053; G10K 2210/3055
USPC .......................................................... 381/71.4
See application file for complete search history.

(56) References Cited

FOREIGN PATENT DOCUMENTS

| | | | |
|---|---|---|---|
| CN | 109714023 | A | 5/2019 |
| CN | 110010116 | A | 7/2019 |
| CN | 114464157 | A | 5/2022 |

* cited by examiner

ACTIVE NOISE REDUCTION METHOD AND DEVICE FOR VEHICLE AND STORAGE MEDIUM

This application claims priority from Chinese Patent Application No. CN 202111683122.1 filed on Dec. 31, 2021.

TECHNICAL FIELD

The present disclosure directs to field of vehicle noise control, and relates to an active noise reduction method and device for a vehicle, and a storage medium.

BACKGROUND

As the development of modern industry, noise pollution issue is increasingly attracting people's attention, and high-intensity noise signals also affect the comfort of listeners. It is needed to increase volume to achieve a higher signal-to-noise ratio and a clear audio effect due to masking of the noise. A prolonged high sound pressure will cause an irreversible hearing damage. With the improvement of vehicle intelligence, drivers and passengers have increasingly strict requirements for the acoustic environment inside the vehicle. The noise inside the vehicle may reduce the comfort of drivers and passengers, causing annoyance and fatigue among passengers inside the vehicle, it can also affect the clarity of communication and calls, and even affect the driver's perception of external signal sounds, increasing hidden troubles of traffic. Automotive NVH (Noise, Vibration, Harshness) is an important concern for vehicle manufacturers. The scheme of reducing noise by modifying structural design, employing damping materials, or using devices such as shock-absorbing springs is collectively referred to as passive noise control, this method has a good noise reduction effect on medium and high-frequency noise. However, this method has a relatively poor effect on low frequencies, especially the noise from the engine inside the compartment, which is often concentrated in low frequencies. In addition, passive noise control requires a long adjusting time and is difficult to control costs. The active noise reduction solution utilizes the vehicle-mounted audio system to establish a reverse signal of the noise signal, and form a secondary sound wave to cancel out the noise in a target area, reduce noise pollution, and improve subjective listening comfort, but it almost does not add extra weight to the vehicle, which helps to reduce exhaust emissions, and is a green and energy-saving solution.

The LMS algorithm is a traditional on-board active noise reduction scheme, but its convergence speed is slow. Subsequently, a momentum-based FxLMS (Filtered x, Least Mean Square) algorithm was proposed, which adds a momentum term due to an increase in weight coefficients to the traditional LMS algorithm. Although the momentum-based FxLMS algorithm improves the convergence speed of traditional LMS algorithms, the convergence speed of the method is still relatively slow.

SUMMARY

An object of the present disclosure is to provide an active noise reduction method for a vehicle, which can actively reduce the noise of vehicle engines, reduce interior noise pollution, and has a fast convergence speed.

Another object of the present disclosure is to provide an active noise reduction device for a vehicle using the active noise reduction method mentioned above.

A third object of the present disclosure is to provide a computer readable storage medium that stores a program capable of implementing the active noise reduction method mentioned above.

A first aspect of the present disclosure provides an active noise reduction method for a vehicle including the following steps:

S1, generating two reference signals $x_1(n)$ and $x_2(n)$ according to angular frequency $\omega_0$ of a target noise to be denoised, wherein n represents time;

S2, generating a control signal y(n) according to the following formula (1), and sending it to a sound reproduction device, $$y(n)=\sum_{i=1}^{2} w_i(n)x_i(n) \quad i=1,2 \tag{1}$$

wherein, $w_i(n)$ represents a coefficient of a control filter at current time (time n), this coefficient is adaptively updated, as detailed in step S5;

S3, filtering the reference signals generated in step S1, to obtain filtered reference signals $\hat{x}_i(n)$ as shown in formula (2);

$$\hat{x}_i(n)=\sum_{k=0}^{N-1} s_k x_i(n-k), \quad i=1,2 \tag{2}$$

wherein, k=0, 1, . . . N−1, N represents a length of the filter, $s_k$ represents a coefficient of a transfer function model filter of a secondary channel; a transfer function of the secondary channel is a mathematical model of transmission path from the sound reproduction device (loudspeaker) to a acoustic signal acquisition device (microphone), $x_i(n-k)$ represents a value of preceding k sampling times of an i-th reference signal;

S4, calculating a noise signal $\hat{d}(n)$ according to the following formula (3), $$\hat{d}(n)=e(n)+\sum_{k=0}^{N-1} s_k y(n-k) \tag{3}$$

wherein, e(n) represents an error signal in the sense of signal processing, and is actually and physically a signal collected by a microphone, y(n−k) represents a value of preceding k sampling times of the control signal sent to the loudspeaker;

The active noise reduction method further comprises steps of:

S5, updating an auxiliary control parameter $\hat{w}_i$ according to the following formula (4), $$\hat{w}_i(n+1)=w_i(n)+\lambda[w_i(n)-w_i(n-1)], \quad i=1,2 \tag{4}$$

wherein, λ represents a constrain factor, and is a relatively small constant, $w_i(n-1)$ represents a coefficient of the control filter at the previous sampling time;

S6, calculating an updated auxiliary control parameter-based error signal $\hat{e}(n)$ according to the following formula (5), $$\hat{e}(n) = \hat{d}(n) - \sum_{i=1}^{2} \hat{w}_i(n+1)\hat{x}_i(n) \tag{5}$$

S7, updating the control parameter according to the following formula (6), $$w_i(n+1) = \hat{w}_i(n+1) + \mu\hat{e}(n)\hat{x}_i(n),\ i = 1, 2 \tag{6}$$

wherein, μ represents a convergence factor, $w_i(n+1)$ represents a coefficient of the control filter at a next sampling time.

Herein, the reference signal in practical physics refers to the angular frequency $\omega_0$ of the target noise to be denoised calculated based on the vehicle engine speed, and a harmonic-frequency signal based on it; the control signal can be amplified by a power amplifier and sent to a sound reproduction device (such as a voice coil of a loudspeaker) for electroacoustic conversion, to form the secondary sound wave for noise cancellation; e(n) represents an error signal in the sense of signal processing, and is actually and physically the signal collected by a sound acquisition device (for example, a microphone) in the area to be denoised inside the compartment.

The "length of the filter" refers to the order of the filter, which is the number of zeros of the filter; the higher the order of the filter is, the higher the frequency resolution, accuracy, and effectiveness are.

In an embodiment, in step S1, the two reference signals $x_1(n)$ and $x_2(n)$ generated according to the function method are shown as the following formulas:

$$x_1(n)=\sin(\omega_0 n)$$

$$x_2(n)=\cos(\omega_0 n).$$

In an embodiment, in step S2, the sound reproduction device is a vehicle-mounted loudspeaker.

In an embodiment, in step S4, the error signal e(n) is obtained by acquiring through a microphone.

Herein, the target noise to be denoised is the noise caused by vehicle engine. The vehicle-mounted loudspeaker mentioned above is arranged within a compartment of the vehicle or to emit sound at least to the compartment of the vehicle, and includes but is not limited to: headrest loudspeakers, roof loudspeakers, door panel loudspeakers, etc.; the microphone mentioned above is arranged within the compartment of the vehicle or to acquire acoustical signals at least within the compartment of the vehicle.

A second aspect of the present disclosure provides an active noise reduction device for a vehicle, which comprises a memory, a processor, and a computer program stored in the memory and runnable on the processor, the processor, when executing the program, implements the above-mentioned active noise reduction method.

In an embodiment, the active noise reduction device further comprises a sound reproduction device used for electroacoustic conversion according to a control signal y(n).

In an embodiment, the sound reproduction device comprises a vehicle-mounted loudspeaker. The vehicle-mounted loudspeaker is arranged within the compartment of the vehicle or to emit sound at least to the compartment of the vehicle, and includes but is not limited to: headrest loudspeakers, roof loudspeakers, door panel loudspeakers, etc.

In an embodiment, the active noise reduction device further comprises a microphone used for acquiring the error signal. The microphone is arranged within the compartment of the vehicle or to be capable of at least acquiring acoustical signals inside the compartment of the vehicle.

A third aspect of the present disclosure is to provide a computer readable storage medium that stores a computer program, the program, when be executed by a processor, implements the above-mentioned active noise reduction method.

The present disclosure adopting the above solutions has the following advantages over the conventional art:

In the active noise reduction method for a vehicle of the present disclosure directed at vehicle engine noise, during the process of updating the control parameter, the auxiliary control parameter $\hat{w}_i(n+1)$ is used as the basis of iteration, and the selection of the error signal is an error signal $\hat{e}(n)$ obtained based on the auxiliary control parameter, the improvement of the control parameter by the momentum is advanced, and the algorithm can converge at a faster speed; at the same time, the vehicle-mounted audio system is utilized to establish a reverse signal of the noise signal, and form a secondary sound wave to cancel out the noise in the target area, reduce noise pollution, and improve subjective listening comfort.

BRIEF DESCRIPTION OF THE DRAWINGS

For more clearly explaining the technical solutions in the embodiments of the present disclosure, the accompanying drawings used to describe the embodiments are simply introduced in the following. Apparently, the below described drawings merely show a part of the embodiments of the present disclosure, and those skilled in the art can obtain other drawings according to the accompanying drawings without creative work.

DETAILED DESCRIPTION

In the following, the preferable embodiments of the present disclosure are explained in detail combining with the accompanying drawings so that the advantages and features of the present disclosure can be easily understood by the skilled persons in the art. It should be noted that the explanation on these implementations is to help understanding of the present disclosure, and is not intended to limit the present disclosure.

Unlike passive noise control, the traditional LMS algorithms can utilize the vehicle-mounted audio system to establish a reverse signal of the noise signal, and form a secondary sound wave to cancel out the noise in the target area, reduce noise pollution, and improve subjective listening comfort, but it almost does not add extra weight to the vehicle, which helps to reduce exhaust emissions, and is a green and energy-saving solution. However, the traditional LMS algorithms have a slow convergence speed, and take more than about 4000 iterations to achieve the target noise reduction. Based on this, a momentum-based FxLMS algorithm was also proposed, which adds a momentum term due to an increase in weight coefficients to the traditional LMS algorithm, and gives an expression for the momentum:

$$w(n+1) = w(n) - 2u_w f(n)x(n) + \alpha[w(n) - w(n-1)]$$

The last term of this expression is the momentum. However, such a momentum-based FxLMS algorithm still has a relatively slow convergence speed.

Figure 1:
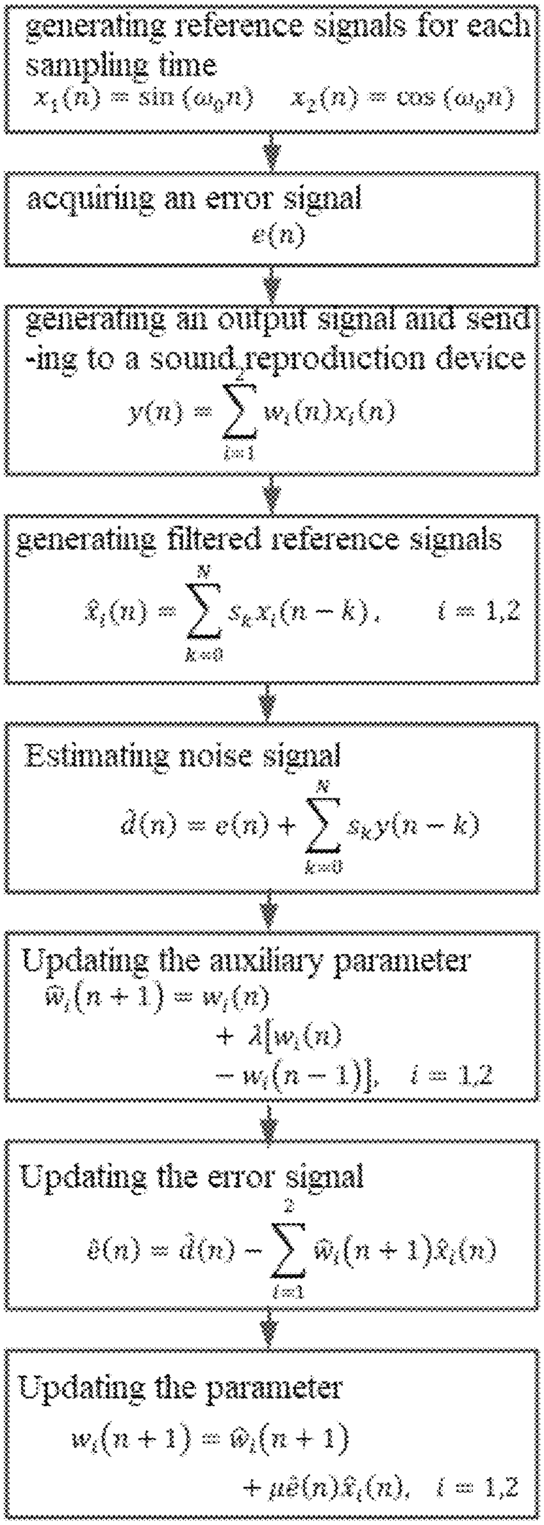
FIG. 1 is a flow chart of an active noise reduction method according to an embodiment of the present disclosure.
Figure 2:
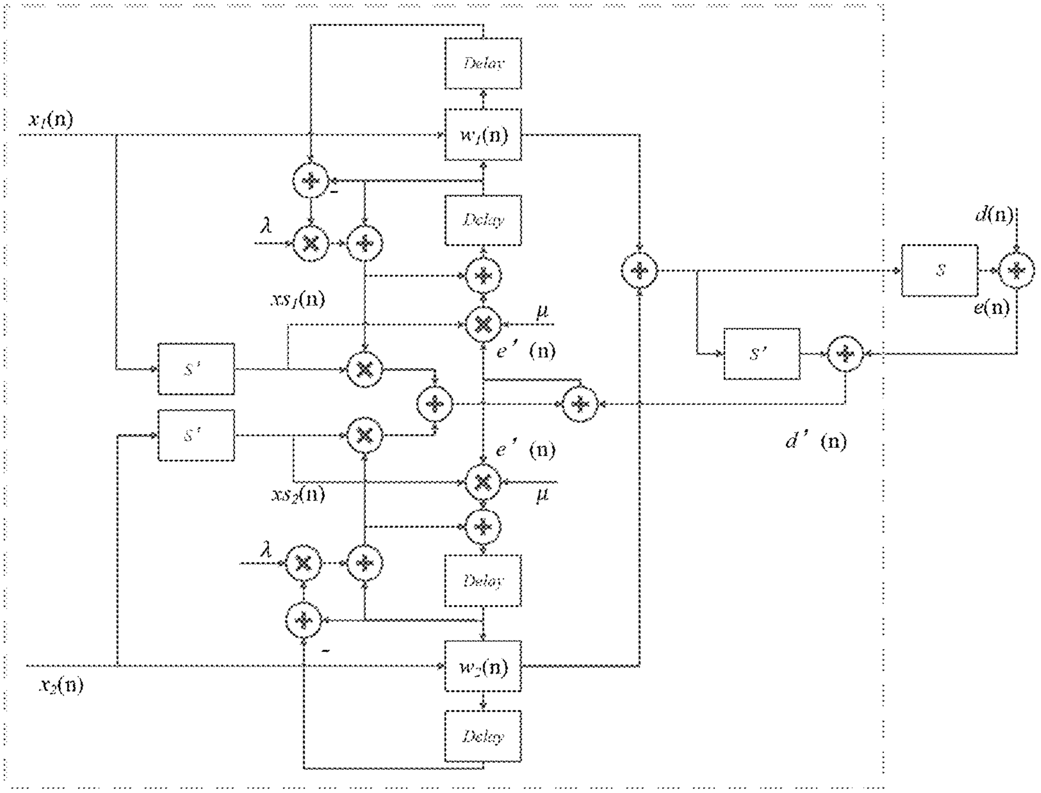
FIG. 2 is an algorithm block diagram of an active noise reduction method according to an embodiment of the present disclosure.

This embodiment provides an improved momentum-based on-board active noise reduction method, which further increases the convergence speed of the algorithm, making it converge faster than the traditional FxLMS algorithm and faster than the momentum-based FxLMS algorithm. FIG. 1 shows a flow chart of this method, and FIG. 2 shows a block diagram of an improved momentum-based FxLMS algorithm. This active noise reduction method is specifically set forth below combining FIG. 1 and FIG. 2.

(1) Generation of the Reference Signals:

At each sampling time, generate reference signals according to the angular frequency $\omega_0$ of a target noise to be denoised, namely the sinusoidal signal and the cosine signal. The target noise to be denoised is the noise caused within the compartment by the vehicle engine.

This embodiment employs a function method to generate the reference signals $$x_1(n)=\sin(\omega_0 n)$$

$$x_2(n)=\cos(\omega_0 n)$$

(2) Generation of the Control Signal:

Generate a control signal y(n) according to the parameter $w_i(n)$ at the current time and the reference signals generated in the last step, send to a sound reproduction device such as loudspeaker of the vehicle-mounted audio system, the loudspeaker is a vehicle-mounted loudspeaker arranged within the compartment, used to play secondary sound waves into the compartment to expect cancelling out the noise caused by the engine inside the compartment.

$$y(n) = \sum_{i=1}^{2} w_i(n)x_i(n)$$

(4) Generation of the Filtered Reference Signals:

An important step in the FxLMS algorithm is to filter the reference signals. It is generally believed that the transfer function of the secondary channel comprises a transmission path of the digital control signal y(n) through a DAC module, an analog filter, a power amplifier module, a loudspeaker, a space propagation of sound waves, a microphone, an analog filter, and an ADC module. The transfer function S of the secondary channel is obtained through online or offline system identification methods, expressed as S', which is a digital filter of length N, represented as $S'=[s_0, s_2, \ldots s_{N-1}]$. The filtered reference signal obtained through calculation is:

$$\hat{x}_i(n) = \sum_{k=0}^{N-1} s_k x_i(n-k),\ i = 1, 2$$

(5) Estimation of the Noise Signal.

According to the error signal e(n) acquired through the microphone, combining the estimation of the transfer function of the secondary channel, the actual noise field signal $\hat{d}(n)$ can be calculated. The microphone is specifically a microphone arranged within the compartment, which acquires acoustical signal inside the compartment at current time, so as to calculate the actual noise field signal at present.

Here, the MFxLMS algorithm structure is applied, and it needs to reestimate the noise signal, which is specifically represented as $$\hat{d}(n) = e(n) + \sum_{k=0}^{N-1} s_k y(n-k)$$

(6) Update the Auxiliary Control Parameter it.

It is a coefficient that combines the parameter $w_i(n)$ of the previous time and the momentum $$\hat{w}_i(n+1) = w_i(n) + \lambda[w_i(n) - w_i(n-1)],\ i = 1, 2$$

(7) Calculate an Updated Auxiliary Control Parameter $\hat{w}_i$-Based Error Signal.

The estimated noise signal, the filtered reference signal, and the auxiliary control parameter are applied. If the transfer function of the secondary channel is accurately estimated, it is considered to be consistent with the transfer function of the real physical channel, and can be considered that the estimated noise signal and filtered reference signal are not different from the real situation. In this case, the difference between the error signal $\hat{e}(n)$ and the error signal e(n) picked up by the microphone is the difference between the control parameters $\hat{w}_i$ and $w_i(n)$. And the difference between them is the momentum. That is one difference between our improved momentum and the traditional momentum-based FxLMS algorithm. The improvement of the control parameter by the momentum is more advanced, so the algorithm can converge at a faster speed. The specific calculation expression is $$\hat{e}(n) = \hat{d}(n) - \sum_{i=1}^{2} \hat{w}_i(n+1)\hat{x}_i(n)$$

(8) Update the Control Parameter $w_i(n)$.

This expression is similar to the update expression of the control parameters in traditional FxLMS algorithms. The difference is that, here, the auxiliary control parameter $\hat{w}_i(n+1)$ is used as the basis for iteration, and the selection of the error signal is the error signal $\hat{e}(n)$ obtained based on the auxiliary control parameter, rather than the error signal e(n) directly acquired from the microphone. The specific expression is $$w_i(n+1) = \hat{w}_i(n+1) + \mu\hat{e}(n)\hat{x}_i(n),\ i = 1, 2$$

Figure 3:
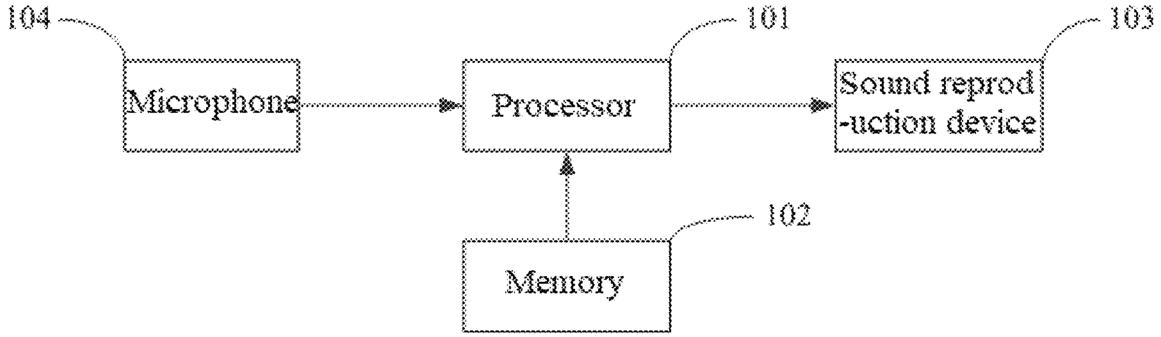
FIG. 3 is a block diagram of an active noise reduction device according to an embodiment of the present disclosure.

Referring to FIG. 3, an active noise reduction device for a vehicle according to this embodiment comprises a memory 102, a processor 101, and a computer program stored in the memory and runnable on the processor 101, the processor 101, when executing the program, implements the above-mentioned active noise reduction method. The memory 102 and the processor 101 are members of the vehicle-mounted audio system, that is, the active noise reduction device uses the vehicle-mounted audio system for active noise control. The active noise reduction device further comprises a sound reproduction device 103 used for electroacoustic conversion according to the control signal y(n), specifically, the vehicle-mounted loudspeaker of the vehicle-mounted audio system includes, but is not limited to: headrest loudspeakers, roof loudspeakers, door panel loudspeakers, etc. The active noise reduction device further comprises a microphone 104 used for acquiring the error signal, which is arranged in an area where noise reduction is required in the compartment.

Simulation Example

Figure 4:
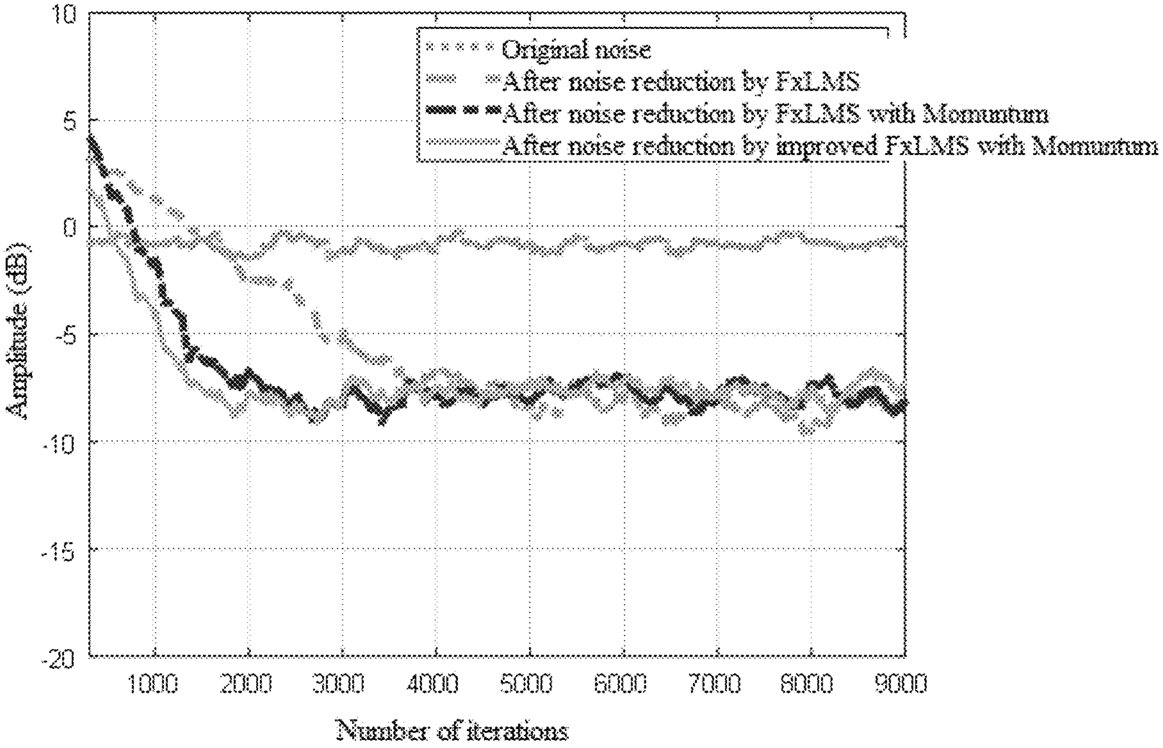
FIG. 4 is a comparison chart of the variation of noise energy with the iteration times.

The convergence performance of the algorithm was simulated. In the simulation experiment, the target noise was a single frequency signal with a frequency of 167 Hz, which is one frequency within a typical control frequency range encountered in the active noise control, especially in the vehicle active noise control. Considering the actual noisy environment, the environmental noise was set as white noise. The signal-to-noise ratio of the entire noise signal was 10 dB. Simulations on the active noise control using the traditional FxLMS (Filtered-x Least Mean Square) algorithm, the momentum-based FxLMS algorithm, and the improved MFxLMS algorithm in this embodiment were conducted. FIG. 4 shows the relationship between the energy of residual noise and the iteration times of the adaptive control algorithm. From FIG. 4, it can be seen that the traditional FxLMS algorithm can effectively reduce noise, but the convergence of the algorithm is relatively slow, and it takes 4000 iterations to achieve a noise reduction of 7 dB; the momentum-based FxLMS algorithm can achieve noise reduction comparable to traditional FxLMS algorithms, but it has a faster convergence speed and achieved convergence through 2500 iterations; the improved momentum-based MFxLMS algorithm proposed in this embodiment has a faster convergence speed and achieved convergence through 1800 iterations.

Those skilled in the art can understand that unless specifically stated, the singular forms "a", "an", "said", and "the" used herein may also include the plural form. It should be further understood that wording "comprises" used in the description of this application refers to the presence of a feature, an integer, a step, an operation, an element and/or an assembly, but does not exclude the presence or addition of one or more other features, integers, steps, operations, elements, assemblies and/or combinations thereof.

The embodiments described above are only for illustrating the technical concepts and features of the present disclosure, are preferred embodiments, and are intended to make those skilled in the art being able to understand the present disclosure and thereby implement it, and should not be concluded to limit the protective scope of this disclosure. Any equivalent variations or modifications according to the spirit of the present disclosure should be covered by the protective scope of the present disclosure.

What is claimed is:

1. An active noise reduction method for a vehicle, comprising:

step S1, generating two reference signals $x_1(n)$ and $x_2(n)$ according to angular frequency $\omega_0$ of a target noise to be denoised, wherein n represents time;

step S2, generating a control signal y(n) according to formula (1), and sending it to a sound reproduction device, $$y(n) = \sum_{i=1}^{2} w_i(n)x_i(n) \quad i = 1, 2 \tag{1}$$

wherein, $w_i(n)$ represents a coefficient of a control filter at current time;

step S3, filtering the two reference signals generated in step S1, to obtain filtered reference signals $\hat{x}_i(n)$ as shown in formula (2), $$\hat{x}_i(n) = \sum_{k=0}^{N-1} s_k x_i(n-k), \; i = 1, 2 \tag{2}$$

wherein k=0,1, . . . N−1, N represents a length of the control filter and $s_k$ represents a coefficient of a transfer function model filter of a secondary channel, wherein a transfer function of the secondary channel is a mathematical model of a transmission path from the sound reproduction device to an acoustic signal acquisition device, and wherein $x_i(n-k)$ represents a value of preceding k sampling times of an i-th reference signal;

step S4, calculating a noise signal $\hat{d}(n)$ according to formula (3), $$\hat{d}(n) = e(n) + \sum_{k=0}^{N-1} s_k y(n-k) \tag{3}$$

wherein e(n) represents an error signal of signal processing and y(n−k) represents a value of preceding k sampling times of the control signal sent to the sound reproduction device;

step S5, updating an auxiliary control parameter $\hat{w}_i$ according to formula (4), $$\hat{w}_i(n+1) = w_i(n) + \lambda[w_i(n) - w_i(n-1)], \; i = 1, 2 \tag{4}$$

wherein $\lambda$ represents a constrain factor and $w_i(n-1)$ represents a coefficient of the control filter at a previous sampling time;

step S6, calculating an updated auxiliary control parameter-based error signal $\hat{e}(n)$ according to formula (5); and $$\hat{e}(n) = \hat{d}(n) - \sum_{i=1}^{2} \hat{w}_i(n+1)\hat{x}_i(n) \tag{5}$$

step S7, updating a coefficient of the control filter according to formula (6), $$w_i(n+1) = \hat{w}_i(n+1) + \mu\hat{e}(n)\hat{x}_i(n), \; i = 1, 2 \tag{6}$$

wherein μ represents a convergence factor and $w_i(n+1)$ represents the coefficient of the control filter at a next sampling time.

2. The active noise reduction method of claim 1, wherein, in step S1, the two reference signals $x_1(n)$ and $x_2(n)$ satisfy:

$x_1(n)=\sin(\omega_0 n)$, and $x_2(n)=\cos(\omega_0 n)$.

3. The active noise reduction method of claim 1, wherein, in step S2, the sound reproduction device is a vehicle-mounted loudspeaker.

4. The active noise reduction method of claim 3, wherein, the vehicle-mounted loudspeaker comprises at least one of a headrest loudspeaker, a roof loudspeaker, and a door loudspeaker.

5. The active noise reduction method of claim 1, wherein, in step S4, the error signal e (n) is obtained by acquiring through a microphone.

6. The active noise reduction method of claim 1, wherein, the target noise to be denoised is caused by vehicle engine.

7. An active noise reduction device for a vehicle, comprising a memory, a processor, and a computer program stored in the memory and runnable on the processor, wherein the processor, when executing the computer program, implements the active noise reduction method of claim 1.

8. The active noise reduction device of claim 7, wherein the sound reproduction device is used for electroacoustic conversion y(n).

9. The active noise reduction device of claim 8, wherein, the sound reproduction device comprises a vehicle-mounted loudspeaker and the vehicle-mounted loudspeaker is arranged within a compartment of the vehicle.

10. The active noise reduction device of claim 9, wherein, the vehicle-mounted loudspeaker comprises at least one of a headrest loudspeaker, a roof loudspeaker, and a door panel loudspeaker.

11. The active noise reduction device of claim 7, wherein, the active noise reduction device further comprises a microphone, and the microphone is arranged within a compartment of the vehicle.

12. A non-transitory computer readable storage medium for storing a computer program, wherein the computer program, when executed by a processor, implements the active noise reduction method of claim 1.

* * * * *